United States Patent
Li et al.

(10) Patent No.: US 10,203,789 B2
(45) Date of Patent: Feb. 12, 2019

(54) TOUCH DISPLAY PANEL COMPRISING A TRANSPARENT CONDUCTING FILM LAYER, METHOD FOR FABRICATION THEREOF AND TOUCH DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jinyu Li, Beijing (CN); Yingming Liu, Beijing (CN); Peizhi Cai, Beijing (CN); Xue Cao, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/327,293

(22) PCT Filed: Apr. 6, 2016

(86) PCT No.: PCT/CN2016/078551
§ 371 (c)(1),
(2) Date: Jan. 18, 2017

(87) PCT Pub. No.: WO2016/177242
PCT Pub. Date: Nov. 10, 2016

(65) Prior Publication Data
US 2017/0177129 A1 Jun. 22, 2017
US 2017/0344161 A9 Nov. 30, 2017

(30) Foreign Application Priority Data
May 6, 2015 (CN) .......................... 2015 1 0226990

(51) Int. Cl.
G06F 3/044 (2006.01)
G06F 3/041 (2006.01)
(Continued)

(52) U.S. Cl.
CPC ........ *G06F 3/0412* (2013.01); *G02F 1/13338* (2013.01); *G02F 1/13439* (2013.01);
(Continued)

(58) Field of Classification Search
CPC ....................................................... G06F 3/041
See application file for complete search history.

(56) References Cited

U.S. PATENT DOCUMENTS

2013/0168138 A1* 7/2013 Yamazaki ............... G06F 3/041
174/253
2014/0346029 A1* 11/2014 Sekizawa ................ G06F 3/044
200/600

FOREIGN PATENT DOCUMENTS

CN 101286106 A 10/2008
CN 103543544 A 1/2014
(Continued)

OTHER PUBLICATIONS

China Patent Office Action, Application No. 201510226990.5, dated Mar. 17, 2017, 15 pps.
(Continued)

*Primary Examiner* — Sanghyuk Park
(74) *Attorney, Agent, or Firm* — Armstrong Teasdale LLP

(57) ABSTRACT

The present disclosure provides a touch display panel including a a display substrate, a touch electrode layer, and an insulating layer located between the display substrate and the touch electrode layer. The touch electrode layer includes a touch graph with grooves. The touch display panel further includes a transparent conducting film layer insulated from the touch electrode layer by the insulating layer.

20 Claims, 5 Drawing Sheets

(51) Int. Cl.
*G02F 1/1333* (2006.01)
*G02F 1/1335* (2006.01)
*G02F 1/1343* (2006.01)

(52) U.S. Cl.
CPC .. *G02F 1/133345* (2013.01); *G02F 1/133502* (2013.01); *G02F 1/133514* (2013.01); *G02F 1/133528* (2013.01); *G02F 1/134309* (2013.01); *G06F 3/041* (2013.01); *G06F 2203/04103* (2013.01)

(56) References Cited

FOREIGN PATENT DOCUMENTS

| | | |
|---|---|---|
| CN | 203930729 U | 11/2014 |
| CN | 204009807 U | 12/2014 |
| CN | 104536620 A | 4/2015 |
| CN | 204302619 U | 4/2015 |
| CN | 104765181 A | 7/2015 |
| JP | 2013069033 A | 4/2013 |
| JP | 2014075017 A | 4/2014 |

OTHER PUBLICATIONS

English Translation of PCT (CN) International Search Report, Application No. PCT/CN2016/078551, dated Jul. 11, 2016, 3 pps.
PCT (CN) Written Opinion, Application No. PCT/CN2016/078551, dated Jul. 11, 2016, 10 pps.: with English Translation.
China Third Office Action, Application No. 201510226990.5, dated Jun. 22, 2018, 14 pps.: with English translation.

\* cited by examiner

TOUCH DISPLAY PANEL COMPRISING A TRANSPARENT CONDUCTING FILM LAYER, METHOD FOR FABRICATION THEREOF AND TOUCH DISPLAY DEVICE

CROSS REFERENCE TO RELATED APPLICATIONS

This application is a National Stage entry of PCT/CN2016/078551 filed Apr. 6, 2016, which claims priority to Chinese patent application number 201510226990.5, which was filed on May 6, 2015, both of which are incorporated by reference herein in their entirety as part of the present application.

BACKGROUND

The embodiments of the disclosure relate to touch display panels, methods for fabrication thereof, and touch display devices including a touch display panel.

In order to realize thinness and lightweight of the touch panel, the integration of the touch panel and the display substrate is increasingly prevalent. For example, a single layer On-Cell touch solution draws extensive attention due to the advantages of low fabricating cost and simple technology, etc., wherein touch electrodes with touch panel functionality are embedded between a liquid crystal display substrate and an up polarizer. In the On-Cell touch solution above, after cell-alignment, a layer of touch electrode is deposited on the upper surface of a color film substrate and a specific pattern with touch functionality is etched on the touch electrode by single step mask process.

However, grooves may be etched between different wires of touch graph in the etching process of the touch graph. The widths of these grooves roughly are within a range of 5-15 micrometers (μm) due to the influences of factors of materials and thickness of the electrode layer, production line process capability, etc. The grooves between the wires are clearly visible under irradiation of reflected light when the display substrate is not lighted or lighted in low gray-scale. Since the grooves cannot reflect light, the reflected light of the display panel becomes nonuniform, thereby producing severe shadow elimination phenomenon. However, the shadow elimination phenomenon above cannot be solved completely by adjustment of the etching process, thus it severely impacts the displaying quality of product.

BRIEF DESCRIPTION

According to the first aspect of the disclosure, there is disclosed a touch display panel including a display substrate, a touch electrode layer, and an insulating layer located between the display substrate and the touch electrode layer, wherein the touch electrode layer includes a touch graph with grooves. The touch display panel further includes a transparent conducting film layer which is insulated from the touch electrode layer by the insulating layer.

According to an embodiment of the disclosure, the transparent conducting film layer includes a conducting film pattern which is complementary with the touch graph.

According to an embodiment of the disclosure, the insulating layer covers on the conducting film pattern of the transparent conducting film layer in a region corresponding to the grooves, and is set on the display substrate in other regions.

According to an embodiment of the disclosure, the whole insulating layer is set on the transparent conducting film layer.

According to an embodiment of the disclosure, the materials of the touch electrode layer and the materials of the transparent conducting film layer are same.

According to an embodiment of the disclosure, the touch display panel further includes a polarizer which is set on the touch electrode layer.

According to the second aspect of the disclosure, there is disclosed a touch display device including the touch display panel as described above.

According to the third aspect of the disclosure, there is disclosed a method for fabricating a touch display panel. The method includes providing a display substrate, forming a transparent conducting film layer on the upper surface of the display substrate, forming an insulating layer, forming a touch electrode layer on the insulating layer, and forming a touch graph in the touch electrode layer, wherein the transparent conducting film layer is insulated from the touch electrode layer by the insulating layer.

According to an embodiment of the disclosure, the method further includes, forming a conducting film pattern in the transparent conducting film layer, wherein the conducting film pattern is complementary with the touch graph.

According to an embodiment of the invention disclosure, the method further includes fitting a polarizer on the touch electrode layer.

The embodiments of the disclosure disclose the touch display panel, the method for fabrication thereof, and the touch display device including the touch display panel. The transparent conducting film layer is set in the embodiments of the disclosure, which is insulated from the touch electrode layer by the insulating layer, and this design causes the light falling at the grooves of the touch electrode layer to pass the insulating layer and illuminate onto the upper surface of the transparent conducting film layer, thereby realizing the light's reflection, compensating segment difference of the light caused by the grooves unable to reflect the light, solving the problems of severe shadow elimination phenomenon and the nonuniform reflected light caused by the grooves of the touch electrode layer, and improving the display quality of display screen.

BRIEF DESCRIPTION OF THE DRAWINGS

In order to illustrate the technique solution of embodiments of the present disclosure more clearly, the accompanying drawings will hereinafter be introduced briefly. It is obvious that the accompanying drawings in the following description are only related to some embodiments of the present disclosure and should not be construed as limited to the present disclosure.

It is noted that the line with down arrow denotes incident ray and the line with up arrow denotes reflection ray.

DETAILED DESCRIPTION

To make the technical solutions and advantages of embodiments of the present disclosure more clear, the technical solutions of embodiments of the present disclosure will be described below clearly and completely in connection with the accompanying drawings of embodiments of the present disclosure. It is obvious that the described embodiments are only some, but not all the embodiments of the present disclosure. Based on the embodiments of the disclosure, all the other embodiments made by those of ordinary skill in the art without the premise of creative work belong to the scope of protection of the disclosure.

It is noted that though the embodiments of the disclosure hereinafter are mainly described in the context of On-Cell touch display panel, it can be understood by those skilled in the art that the embodiments of the disclosure may be applied to any other suitable touch display panels, rather than only limited to the On-Cell touch display panel.

Figure 1:
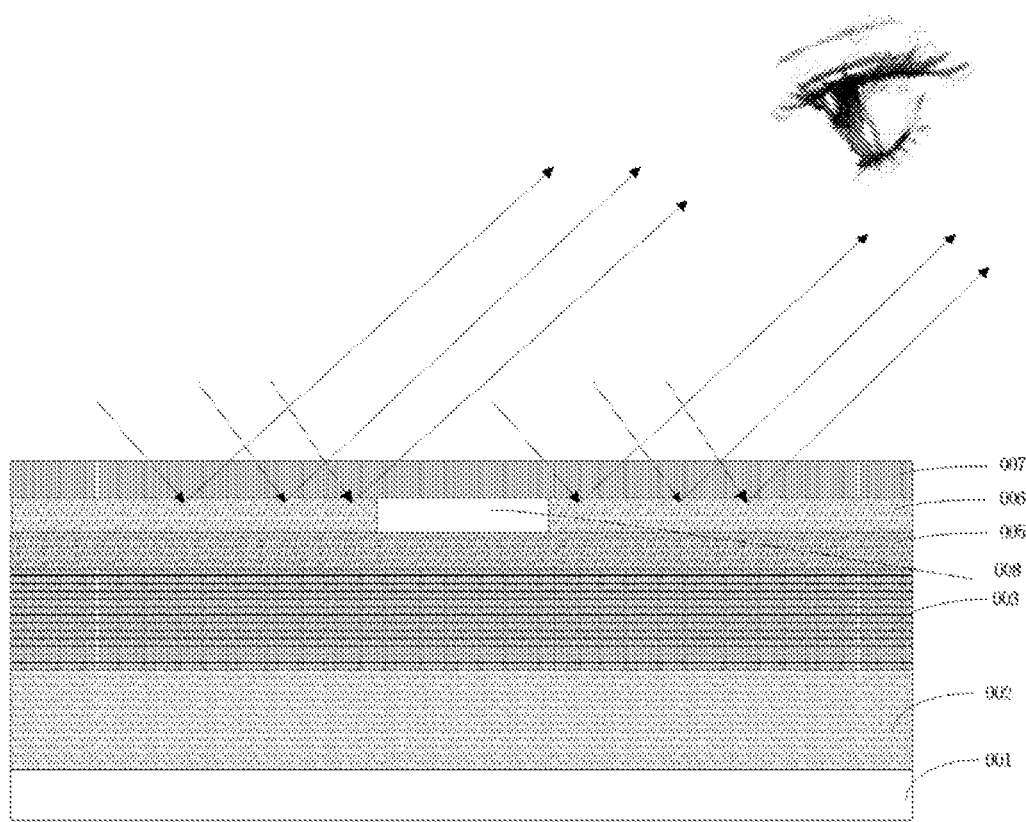
FIG. 1 is a schematic structure diagram of On-Cell touch display panel in the prior art.
Figure 2:
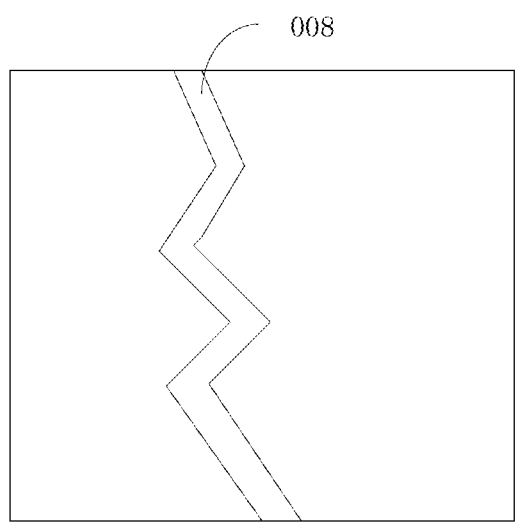
FIG. 2 is a top view of On-Cell touch display panel in the prior art.

FIG. 1 is a schematic structure diagram of On-Cell touch display panel in the prior art. As can be seen from FIG. 1, the touch display panel includes a display substrate, a touch electrode layer 006 and an insulating layer 005 located between the display substrate and the touch electrode layer 006, wherein the touch electrode layer 006 includes a touch graph with a groove 008, the display substrate includes a down polarizer 001, a TFT (Thin Film Transistor) substrate 002 and a color film substrate 003 from bottom to up, and an up polarizer 007 is set on the touch electrode layer 006. The groove 008 is formed by etching between different signal wires of the touch electrode layer 006 of the On-Cell touch display panel in the prior art, as shown in FIG. 2. Since the groove 008 cannot reflect light, it may form segment difference of the light. The segment difference of the light may result in obvious shadows when the display screen is in a power off and under low gray-scale state. In other words, it results in the phenomenon of nonuniform reflected light when the display screen is in a power off and under low gray-scale state, as shown by the light reflection condition in FIG. 1. Thus it generates severe shadow elimination phenomenon and reduces the display quality.

In order to solve or mitigate the above problems, the embodiments of the disclosure disclose a touch display panel including a display substrate, a touch electrode layer and an insulating layer located between the display substrate and the touch electrode layer, wherein the touch electrode layer includes a touch graph with grooves. The touch display panel further includes a transparent conducting film layer which is insulated from the touch electrode layer by the insulating layer. The display substrate of the touch display panel includes a down polarizer, a TFT substrate, and a color film substrate from bottom to up. The touch display panel of embodiments of the disclosure, by setting the transparent conducting film layer between the insulating layer and the display substrate, causes the light falling at the grooves of the touch electrode layer to pass the insulating layer and illuminate onto the upper surface of the transparent conducting film layer, thereby realizing light reflection, compensating segment difference of the light caused by the grooves unable to reflect the light, the touch display panel capable of reflecting uniform light, and avoiding the shadow elimination phenomenon.

It should be understood that the display substrate in the disclosure may be a single substrate such as a color film substrate; or a combination of substrates, such as the display panel formed by cell-alignment of a color film substrate and an array substrate; or may further include an accessory structure such as polarizer etc. For example, "forming" includes setting a material layer by sputtering process, depositing process, etc. and/or constructing a pattern on a material layer by a pattern composition process such as etching, etc.

The advantages of the disclosure will be specifically illustrated by embodiments 1 and 2.

Embodiment 1

Figure 3:
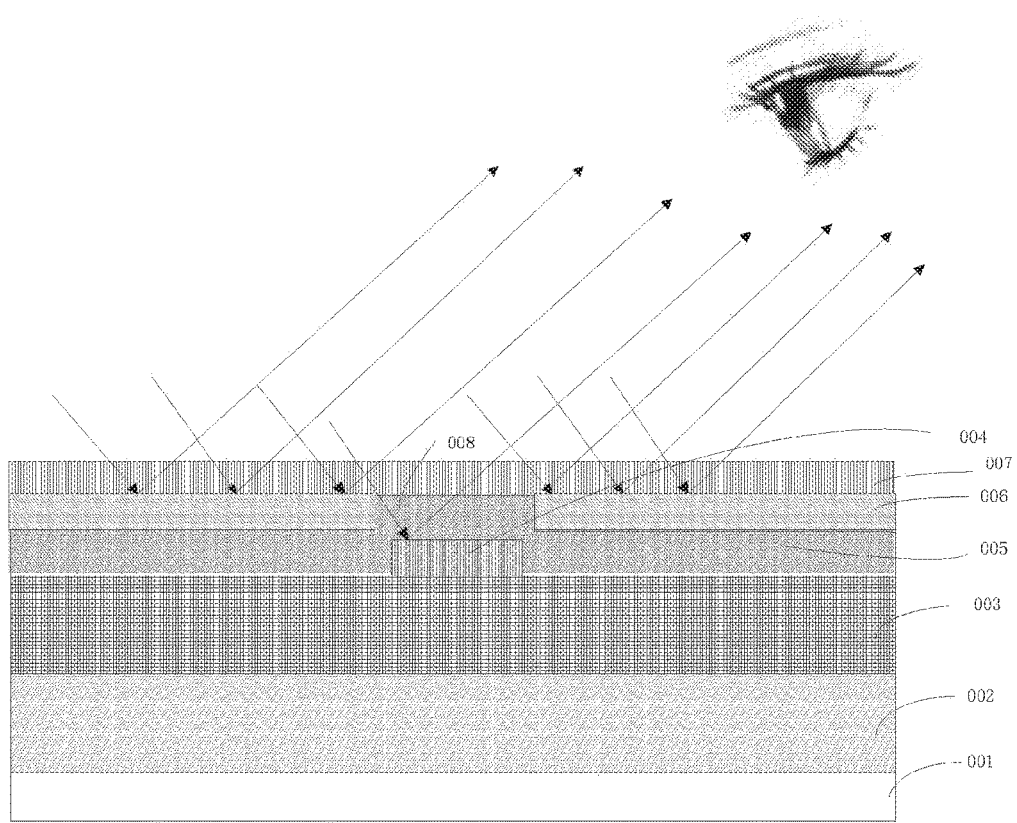
FIG. 3 is a schematic structure diagram of a touch display panel according to an embodiment of the disclosure.
Figure 4:
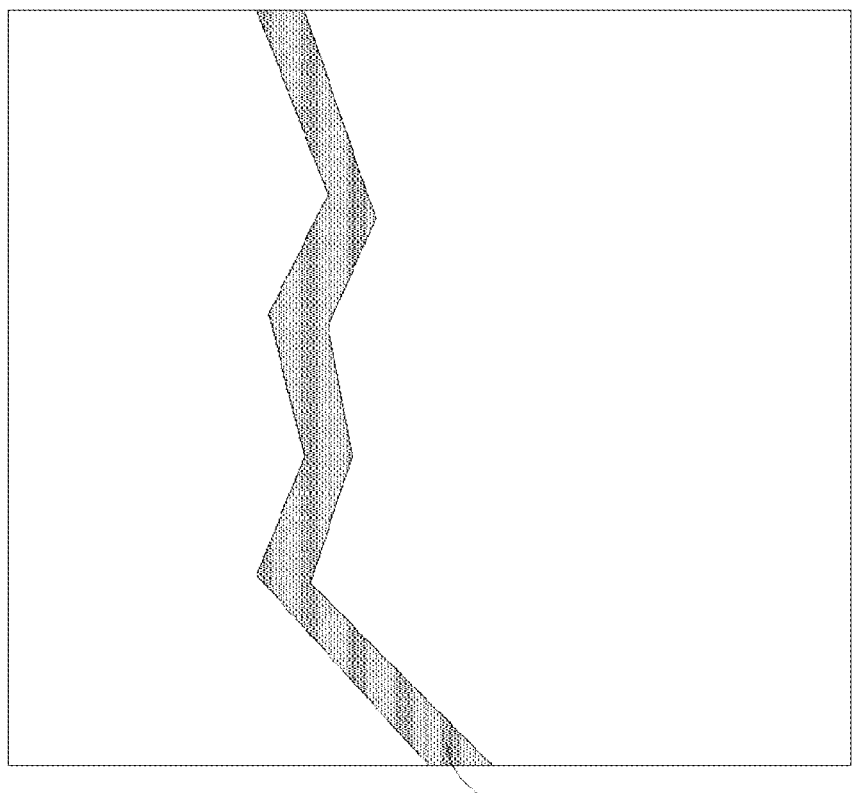
FIG. 4 is a top view of a touch display panel according to an embodiment of the disclosure.

FIG. 3 is a schematic structure diagram of a touch display panel according to an embodiment of the disclosure. In the touch display panel of the embodiment, a TFT substrate 002 is fabricated by array fabricating process, a color film substrate 003 is fabricated on the TFT substrate 002, and a touch electrode layer 006 and a transparent conducting film layer 004 are fabricated after completing cell-alignment by one drop filling (ODF) process. Specifically, a layer of the transparent conducting film layer 004 is deposited on the upper surface of the color film substrate 003, and a specific pattern (i.e., a conducting film pattern) is etched on the transparent conducting film layer 004 by single step mask process, wherein the specific pattern is complementary with the touch graph of the touch electrode layer 006, and the width of figure of the conducting film pattern may be adjusted based on the process capability. After completing etching, a layer of the insulating layer 005 is deposited which is used for causing the transparent conducting film layer 004 to be insulated from the touch electrode layer 006, and the thickness of the insulating layer 005 is made thin as far as possible on the basis of process capability. Subsequently, the touch electrode layer 006 is deposited, the required touch graph is etched by mask process, and groove 008 is formed as shown in FIG. 4. It should be understood that the insulating layer is transparent insulating material such as silicon oxide and silicon nitride whose light reflectivity is far below that of the touch electrode layer and the transparent conducting film layer with conducting material (similar to the metal), therefore it does not help to eliminate shadow phenomenon. The groove 008 of such touch electrode layer exactly complements with the conducting film pattern of the transparent conducting film layer 004, wherein the size of the groove 008 can be adjusted based on the process capability and design requirements.

This embodiment discloses the transparent conducting film pattern being complementary with the touch graph, therefore the transparent conducting film layer 004 is set under the groove 008 of the touch electrode layer 006, thereby compensating the segment difference of the light caused by the groove 008 unable to reflect the light. As shown by the light reflection condition in FIG. 3, the added transparent conducting film layer 004 can achieve good effect of shadow elimination and improve the quality of display screen.

In this embodiment, the insulating layer 005 covers on the conducting film pattern of the transparent conducting film layer 004 in a region corresponding to the groove 008, and is set on the color film substrate 003 of the display substrate in other regions. Such design is equivalent to cause the insulating layer 005 and the transparent conducting film layer 004 to be located in the same layer, thereby benefiting the reduction of thickness of the touch display panel.

In an embodiment, the materials of the touch electrode layer 006 and the materials of the transparent conducting film layer 004 are same, therefore the light reflectivity of the two are same, thereby favorable to the forming of uniform reflection light. For example, the same materials may be transparent conducting materials such as indium tin oxid.

In an embodiment, an up polarizer 007 is set above the touch electrode layer 006 which may play roles of protection and polarization.

Embodiment 2

Figure 5:
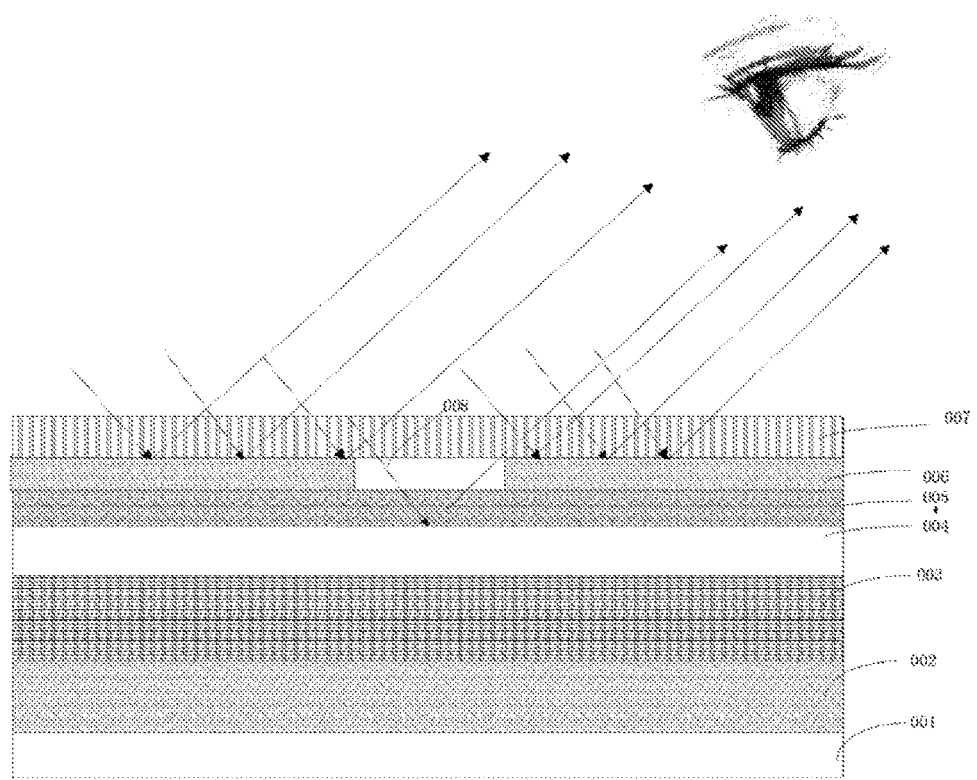
FIG. 5 is a schematic structure diagram of a touch display panel according to another embodiment of the disclosure.

FIG. 5 is a schematic structure diagram of a touch display panel according to another embodiment of the disclosure. In the touch display panel of the embodiment, a TFT substrate 002 is fabricated by array process, a color film substrate 003 is fabricated on the TFT substrate 002, and a touch electrode layer 006 and a transparent conducting film layer 004 are fabricated after cell-alignment by one drop filling (ODF) process. Specifically, a layer of the transparent conducting film layer 004 is deposited on the upper surface of the color film substrate 003, and without mask process, a layer of insulating layer 005 is deposited which is used for causing the transparent conducting film layer 004 to be insulated from the touch electrode layer 006, wherein the thickness of the insulating layer 005 may be made thin as far as possible based on the process capability. Subsequently, the touch electrode layer 006 is deposited, the required touch graph is etched by mask process, and the groove 008 is formed, wherein the size of the groove 008 can be adjusted based on the process capability and design requirements.

This embodiment discloses that the transparent conducting film layer 004 is a whole layer without pattern composition fabrication processing. The whole layer of insulating layer 005 is set on the transparent conducting film layer 004, and the transparent conducting film layer 004 appears at the groove 008 of the touch electrode layer 006 such that the light falling at the groove 008 of the touch electrode layer 006 passes the insulating layer 005 and illuminates the upper surface of the transparent conducting film layer 004, thereby realizing the light's reflection as shown by the light reflection condition in FIG. 5, compensating segment difference of the light caused by the groove 008 unable to reflect the light. Therefore, the added transparent conducting film layer 004 can achieve good effect of shadow elimination and improve the quality of display screen. In addition, the transparent conducting film layer is not required to be etched in the embodiment, thereby reducing a step of mask process, improving production efficiency and smoothing the insulating layer.

In an embodiment, the materials of the touch electrode layer 006 and the materials of the transparent conducting film layer 004 are the same, therefore the light reflectivity of the two are the same, thereby favorable to the forming of uniform reflection light. For example, the same materials may be transparent conducting materials such as indium tin oxid.

In an embodiment, an up polarizer 007 is set above the touch electrode layer 006 which may play roles of protection and polarization.

The embodiment of the disclosure further provides a touch display device including the touch display panel as described above. The touch display device may be products or parts with the touching and displaying capability, such as tablet, mobile phone, television, navigator, video camera, camera, digital photo frame, etc.

Figure 6:
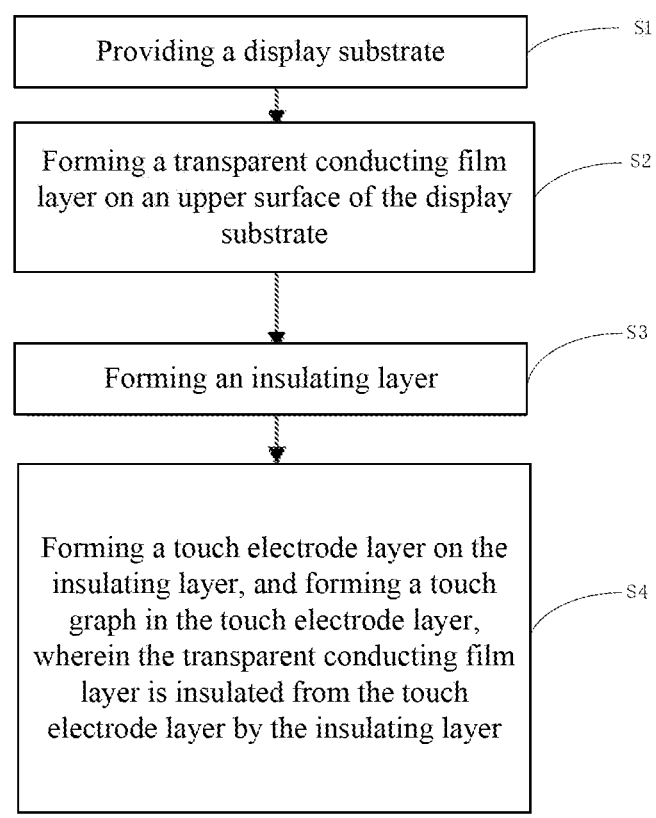
FIG. 6 is a flow chart of a method for fabricating a touch display panel according to an embodiment of the disclosure.

The embodiments of the disclosure further provide a method for fabricating a touch display panel. As shown in FIG. 6, the method includes the following steps:

S1, providing a display substrate;

S2, forming a transparent conducting film layer on the upper surface of the display substrate;

S3, forming an insulating layer; and

S4, forming a touch electrode layer on the insulating layer, and forming a touch graph in the touch electrode layer, wherein the transparent conducting film layer is insulated from the touch electrode layer by the insulating layer.

The touch display panel fabricated by using the method for fabricating the touch display panel according to embodiments of the disclosure, by forming the transparent conducting film layer between the insulating layer and the display substrate, causes the light falling at the grooves of the touch electrode layer to pass the insulating layer and illuminate the upper surface of the transparent conducting film layer, thereby realizing the light's reflection, enabling the touch display panel to reflect uniform light, and avoiding the shadow elimination phenomenon, wherein the touch graph has grooves.

In an embodiment, the display substrate includes a down polarizer, an array substrate, and a color film substrate from bottom to up. The method of the disclosure further includes a step of fitting an up polarizer on the touch electrode layer, which may play roles of protection and polarization. In addition, the display substrate may be any other suitable existing or future display substrate in other embodiments.

In an embodiment, in order to form the product structure of embodiment 1, the method of embodiment of the disclosure further includes forming a conducting film pattern in the transparent conducting film layer, wherein the conducting film pattern is complementary with the touch graph, and the insulating layer covers on the conducting film pattern of the transparent conducting film layer in a region corresponding to the grooves, and is set on the display substrate in other regions. Such design, that the transparent conducting film layer is set at the region corresponding to the grooves of the touch electrode layer by setting the conducting film pattern to be complementary with the touch graph, compensates the segment difference of the light caused by the grooves unable to reflect the light, such structure is equivalent to the insulating layer and the transparent conducting film layer being in the same layer, thereby reducing the thickness of the panel.

In an embodiment, in order to form the product structure of embodiment 2, the transparent conducting film layer fabricated by using the method of embodiment of the disclosure is a whole layer without pattern composition fabrication processing, wherein the whole layer of insulating layer is set on the transparent conducting film layer, and the transparent conducting film layer is not required to be etched in such design, thereby reducing a process step and smoothing the insulating layer.

In an embodiment, the materials of the touch electrode layer and the materials of the transparent conducting film layer formed by using the method of the disclosure are same. Therefore the light reflectivity of the two are the same, thereby favorable to the forming of uniform reflection light. For example, the same materials may be transparent conducting materials such as indium tin oxid.

The implementations above are only for illustrating the embodiment of the disclosure rather than limiting the disclosure. Though the disclosure have been described in detail with reference to embodiments, it should be understood by those ordinary skilled in the art that various combinations, modifications and equivalent replacements of the solution of the disclosure can be made without departing from the spirit and scope of the solution of the disclosure.

What is claimed is:

1. A touch display panel comprising:
a display substrate;
a touch electrode layer; and
an insulating layer located between the display substrate and the touch electrode layer, wherein the touch electrode layer comprises a touch graph with grooves, and wherein the touch display panel further comprises a transparent conducting film layer which is formed on the display substrate and under the touch electrode layer and is insulated from the touch electrode layer by the insulating layer, wherein the touch electrode layer is formed only on one side of the insulating layer, the transparent conducting film layer is formed only on the other side of the insulating layer, the transparent conducting film layer is independent of the touch electrode layer, wherein the transparent conducting film layer is provided only in a region corresponding to the grooves such that a light falling at the groove of the touch electrode layer passes the insulating layer and illuminates an upper surface of the transparent conducting film layer, thereby realizing a reflection of the light and the touch display panel capable of reflecting uniform light.

2. The touch display panel according to claim 1, wherein the transparent conducting film layer comprises a conducting film pattern which is complementary with the touch graph.

3. The touch display panel according to claim 2, wherein the insulating layer covers the conducting film pattern of the transparent conducting film layer in a region corresponding to the grooves, and is set on the display substrate in other regions.

4. The touch display panel according to claim 3, wherein the materials of the touch electrode layer and the materials of the transparent conducting film layer are the same.

5. A touch display device comprising the touch display panel according to claim 3.

6. The touch display panel according to claim 2, wherein the materials of the touch electrode layer and the materials of the transparent conducting film layer are the same.

7. A touch display device comprising the touch display panel according to claim 2.

8. The touch display panel according to claim 2, the touch display panel further comprising a polarizer set on the touch electrode layer.

9. The touch display panel according to claim 1, wherein the whole insulating layer is set on the transparent conducting film layer.

10. The touch display panel according to claim 9, wherein the materials of the touch electrode layer and the materials of the transparent conducting film layer are the same.

11. A touch display device comprising the touch display panel according to claim 9.

12. The touch display panel according to claim 1, wherein the materials of the touch electrode layer and the materials of the transparent conducting film layer are the same.

13. A touch display device comprising the touch display, panel according to claim 12.

14. The touch display panel according to claim 1, wherein the touch display panel further comprises a polarizer set on the touch electrode layer.

15. A touch display device comprising the touch display panel according to claim 14.

16. A touch display device comprising the touch display panel according to claim 1.

17. A method for fabricating a touch display panel, comprising:
providing a display substrate;
forming a transparent conducting film layer on an upper surface of the display substrate;
forming an insulating layer;
forming a touch electrode layer on the insulating layer, wherein the touch layer comprises a touch graph with grooves; and
forming a touch graph in the touch electrode layer, wherein the transparent conducting film layer is formed on the display substrate and under the touch electrode layer and is insulated from the touch electrode layer by the insulating layer, wherein the touch electrode layer is formed only on one side of the insulating layer, the transparent conducting film layer is formed only on the other side of the insulating layer, the transparent conducting film layer is independent of the touch electrode layer, wherein the transparent conducting film layer is provided only in a region corresponding to the grooves such that a light falling at the groove of the touch electrode layer passes the insulating layer and illuminates an upper surface of the transparent conducting film layer, thereby realizing a reflection of the light and the touch display panel capable of reflecting uniform light.

18. The method according to claim 17, further comprising:
forming a conducting film pattern in the transparent conducting film layer, wherein the conducting film pattern is complementary with the touch graph.

19. The method according to claim 18, the method further comprising fitting a polarizer on the touch electrode layer.

20. The method according to claim 17, further comprising fitting a polarizer on the touch electrode layer.

* * * * *

UNITED STATES PATENT AND TRADEMARK OFFICE
CERTIFICATE OF CORRECTION

PATENT NO. : 10,203,789 B2
APPLICATION NO. : 15/327293
DATED : February 12, 2019
INVENTOR(S) : Jinyu Li et al.

It is certified that error appears in the above-identified patent and that said Letters Patent is hereby corrected as shown below:

On the Title Page

Item (54), in Title, and in the Specification, Column 1, Lines 1-4, delete "TOUCH DISPLAY PANEL COMPRISING A TRANSPARENT CONDUCTING FILM LAYER, METHOD FOR FABRICATION THEREOF AND TOUCH DISPLAY DEVICE" and insert therefor -- TOUCH DISPLAY PANEL COMPRISING A TRANSPARENT CONDUCTING FILM LAYER, METHOD FOR FABRICATION THEREOF AND TOUCH DISPLAY DEVICE COMPRISING THE TOUCH DISPLAY PANEL --.

In the Claims

In Claim 13, Column 8, Lines 1-2, delete "display, panel" and insert therefor -- display panel --.

Signed and Sealed this
Fifth Day of November, 2019

Andrei Iancu
*Director of the United States Patent and Trademark Office*